Patented Mar. 29, 1932

1,851,036

UNITED STATES PATENT OFFICE

TRACY F. BRACKETT, OF HIGHLAND PARK, MICHIGAN, ASSIGNOR TO THE TIMKEN-DETROIT AXLE COMPANY, OF DETROIT, MICHIGAN, A CORPORATION OF OHIO

BRAKE BLOCK COMPOSITION

No Drawing. Application filed June 20, 1931. Serial No. 545,860.

This invention relates to compositions for making brake blocks, brake linings and the like, and has for its principal object to produce a composition that may be molded or otherwise formed into shape and then baked with a minimum of warping to produce a product that will resist heat, oil and water and, when used as a brake block or lining, will be quiet, wear well, afford smooth deceleration and will not abrade the frictional surface with which it mates.

My composition comprises two principal mixtures, namely, a mixture whose principal ingredient is asbestos and which is hereinafter referred to as the body or body mixture and a second mixture hereinafter referred to as the bond or bond mixture. The body mixture consists mainly of asbestos fiber together with a relatively small amount of powdered talc and flaked graphite well mixed therewith in the dry state. A representative body mixture consists of about fourteen pounds of short fiber asbestos, one pound of powdered talc, and about one-half pound of medium flaked graphite, the talc and graphite serving as lubricants for the asbestos and admitting of considerable variation in proportion.

The bond mixture comprises vegetable pitch, petroleum asphalt, linseed oil and China wood oil in substantially the proportion of about four pounds of vegetable pitch, about two pounds of asphalt, preferably blown petroleum asphalt, about one pound of linseed oil, and about one pound of China wood oil. These materials are thoroughly melted and mixed together, and the mixture added in the liquid form to the dry body mixture above mentioned and thoroughly mixed therewith.

When the body mixture and the bond mixture are thoroughly stirred together, manganese dioxide, litharge and pulverized sulphur are added thereto. For the quantities of body material and bond material above specified, about one-fourth of a pound of manganese dioxide, about one-half pound of litharge and about one-half pound of pulverized sulphur are suitable, but these amounts admit of variation.

The composition above described is plastic and may be readily molded in a die or otherwise worked into desired form. After the composition is formed to shape, it is placed in an oven and baked to the desired degree of hardness. It is a great merit of my composition that it endures baking without any substantial warping or distortion. The baked product will resist heat, oil and water, is non-abrasive and, when used as a brake lining, is quiet, wears well and decelerates smoothly. The bonding material is, in effect, a high grade baking enamel, which may be used in larger proportion to the body material than has heretofore been practicable; and as the particles of asbestos are suitably lubricated, they slide over one another, under pressure, and consequently avoid the tendency to form uneven pressure spots on the brake surface.

What I claim is:

1. A composition comprising a body mixture consisting of about fourteen pounds of asbestos fiber, about one pound of talc and about one-half pound of graphite and a bond comprising four pounds of vegetable pitch, two pounds of blown petroleum asphalt, one pound of linseed oil and one pound of China wood oil.

2. A molded and baked composition comprising the following ingredients in substantially the following proportions, namely, about fourteen pounds of asbestos fiber, about one pound of talc, about one-half pound of graphite, four pounds of vegetable pitch, two pounds of blown petroleum asphalt, one pound of linseed oil and one pound of China wood oil.

3. A composition of matter comprising the following ingredients in substantially the following proportions, namely, fourteen pounds asbestos, one pound of powdered talc, one-half pound of flaked graphite, four pounds of vegetable pitch, two pounds of blown petroleum asphalt, one pound of linseed oil, one pound of China wood oil, one-fourth pound of manganese dioxide, one-half pound of litharge and one-half pound of sulphur.

4. A molded and baked composition of matter made up of the following ingredients in substantially the following proportions, namely, fourteen pounds of asbestos, one pound of powdered talc, one-half pound of flaked graphite, four pounds of vegetable pitch, two pounds of blown petroleum asphalt, one pound of linseed oil, one pound of China wood oil, one-fourth pound of manganese dioxide, one-half pound of litharge and one-half pound of sulphur.

5. The process which consists in making a plastic composition comprising the following ingredients in substantially the following proportions, namely, fourteen pounds of asbestos, one pound of powdered talc, one-half pound of flaked graphite, four pounds of vegetable pitch, two pounds of blown petroleum asphalt, one pound of linseed oil, one pound of China wood oil, one-fourth pound of manganese dioxide, one-half pound of litharge and one-half pound of sulphur, shaping such plastic composition, and then baking the same.

Signed at Detroit, Michigan, this 15th day of June, 1931.

TRACY F. BRACKETT.